Figure 1:
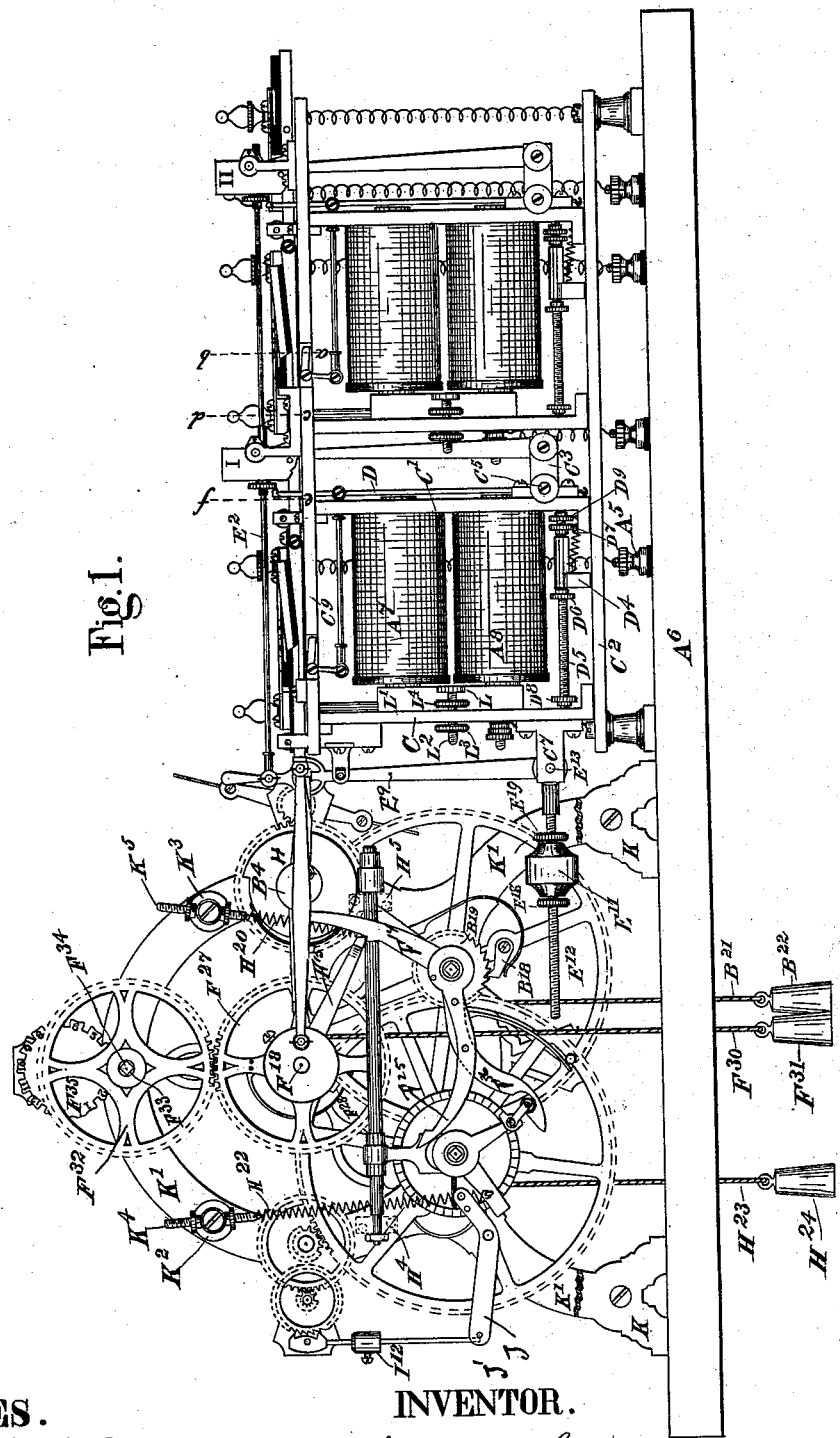

(No Model.) 6 Sheets—Sheet 1.

T. F. GAYNOR.
FIRE ALARM TELEGRAPH REPEATER.

No. 509,216. Patented Nov. 21, 1893.

WITNESSES.
Milt V. Barlow
Frank Pardon.

INVENTOR.
Thomas F. Gaynor.

(No Model.)  6 Sheets—Sheet 2.

T. F. GAYNOR.
FIRE ALARM TELEGRAPH REPEATER.

No. 509,216.  Patented Nov. 21, 1893.

WITNESSES.  INVENTOR.

(No Model.)

6 Sheets—Sheet 3.

T. F. GAYNOR.
FIRE ALARM TELEGRAPH REPEATER.

No. 509,216. Patented Nov. 21, 1893.

WITNESSES,
Milt V. Barton
Frank Pardon

INVENTOR,
Thomas F. Gaynor.

(No Model.)

T. F. GAYNOR.
FIRE ALARM TELEGRAPH REPEATER.

No. 509,216.

6 Sheets—Sheet 4.

Patented Nov. 21, 1893.

WITNESSES,
Milt. V. Barlow
Frank Pardon.

INVENTOR,
Thomas F. Gaynor.

(No Model.)
T. F. GAYNOR.
FIRE ALARM TELEGRAPH REPEATER.
No. 509,216. Patented Nov. 21, 1893.
Fig. 11.
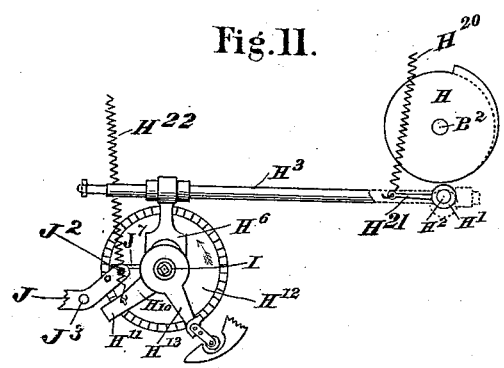
Fig. 12.
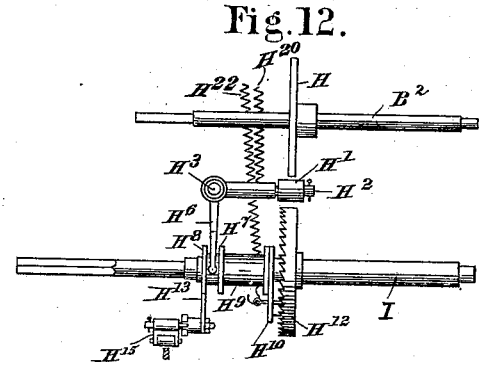
Fig. 19.
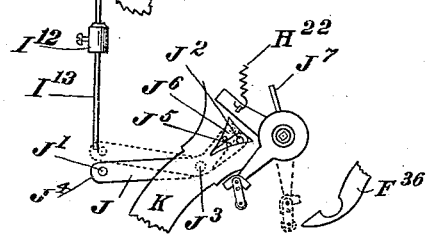
Fig. 13.
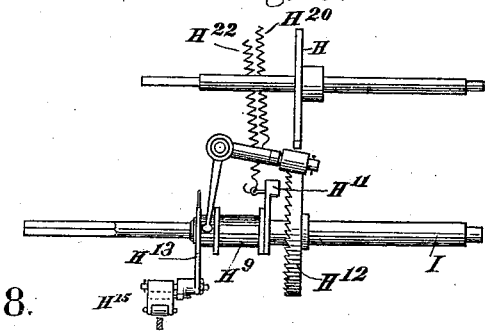
Fig. 20.
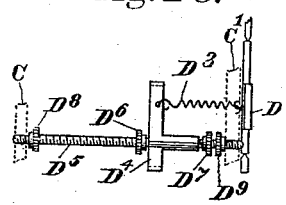
Fig. 18.
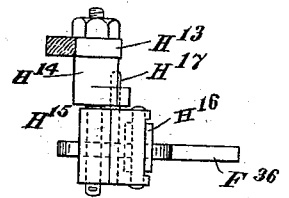
Fig. 14.
Fig. 15.
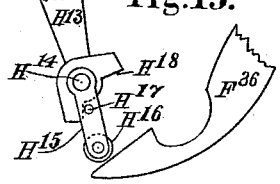
Fig. 16.
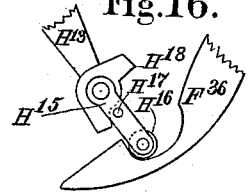
Fig. 17.
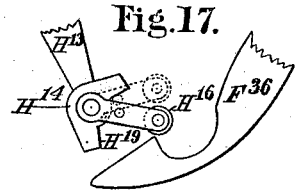
WITNESSES,
Milt. V. Barton
Frank Pardon
INVENTOR,
Thomas F. Gaynor (No Model.)  6 Sheets—Sheet 6.
T. F. GAYNOR.
FIRE ALARM TELEGRAPH REPEATER.
No. 509,216. Patented Nov. 21, 1893.
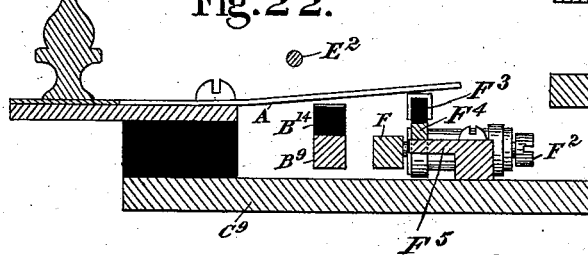
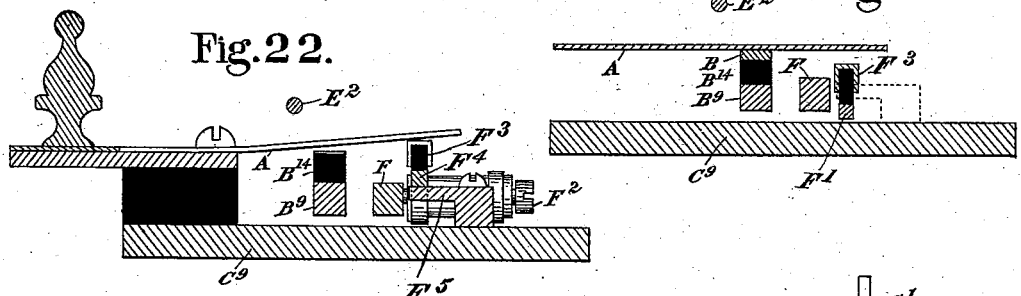
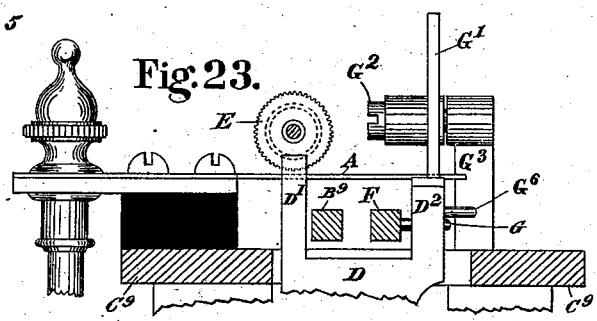
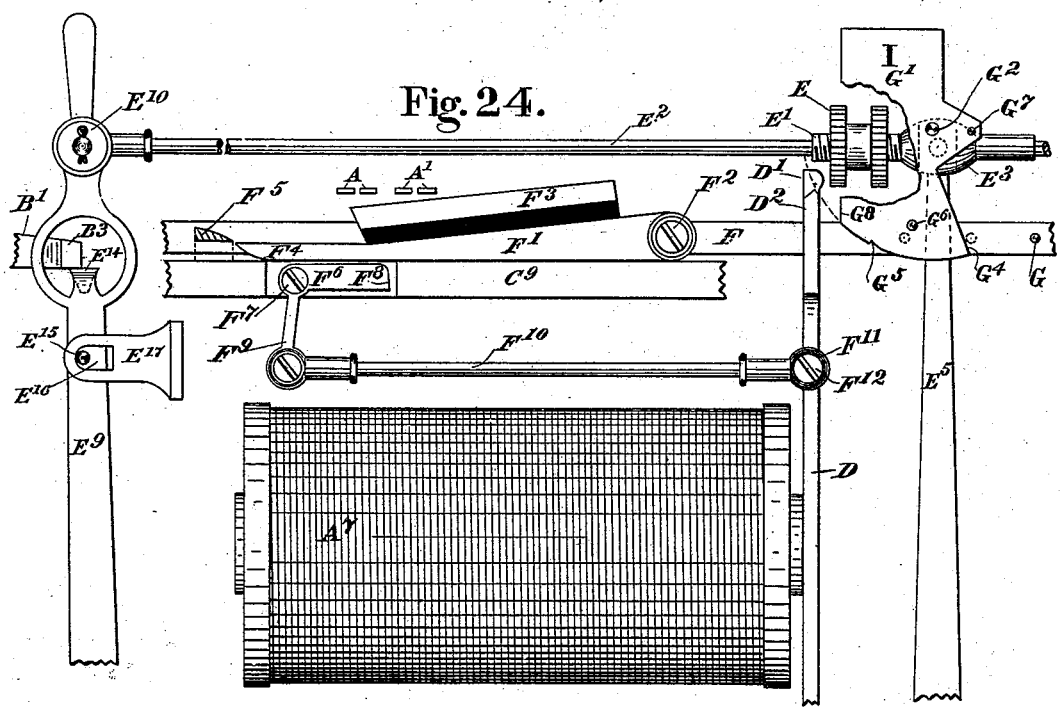
WITNESSES,
Milt V. Barton
Frank Pardon
INVENTOR,
Thomas F. Gaynor

UNITED STATES PATENT OFFICE.

THOMAS F. GAYNOR, OF LOUISVILLE, KENTUCKY, ASSIGNOR, BY MESNE ASSIGNMENTS, TO THE NEW GAYNOR ELECTRIC COMPANY, OF SAME PLACE.

FIRE-ALARM-TELEGRAPH REPEATER.

SPECIFICATION forming part of Letters Patent No. 509,216, dated November 21, 1893.

Application filed March 2, 1891. Serial No. 383,332. (No model.)

*To all whom it may concern:*

Be it known that I, THOMAS F. GAYNOR, of Louisville, county of Jefferson, State of Kentucky, have invented an Improvement in Fire-Alarm-Telegraph Repeaters, of which the following is a specification, reference being had to the accompanying drawings, forming a part thereof.

This invention relates to that class of fire alarm telegraphs which are known as "automatic," in which a signal that is transmitted over one circuit by the action of a signal box mechanism therein is automatically repeated over all the other circuits connected with the repeater, so that the alarm mechanism that may be placed therein will sound and register the signals given by the operating box automatically. In almost all automatic systems it is deemed expedient to have the system divided into several independent circuits in which the signal boxes are placed. To economize in wire, it is also customary to put the gongs, indicators, tower bell strikers, &c., in the signal box circuits. In some instances, however, the alarm mechanism is placed in one or more independent circuits in which no signal mechanism is connected. Now, the requirements of a repeater for such systems may be stated as follows: first, to break all the non-operating circuits in response to the breaks coming over the operating box circuit; second, not to allow any breaks in the operating circuit occur at the repeater, as the break wheel of the operating box must cause the only breaks in the circut during its operation; third, to repeat the breaks and closures made in the operating circuit by the box of a corresponding duration over the non-operating circuits; fourth, to prevent non-operating circuits from causing any interference that might be made by a subsequent "pulling" of another box therein or the like with the signals coming in over the operating box circuit; fifth, to permanently cut out a circuit that might be disabled by cutting the wires, allowing the batteries to run down, or the like, so that such a disabled circuit would not render the other circuits inoperative, and the system totally useless; sixth, to automatically restore connections with such a disabled circuit as soon as the same is repaired, and place it in service again.

In constructing machines for this purpose heretofore, it has been the custom to provide two separate magnets and armatures for each of the circuits. It has also been found expedient to have the breaks in the circuits made by a revolving multiple break wheel, upon which pairs of contact springs or circuit terminals rest, so that all the circuits converge upon said break wheel. In addition to this, another set of short circuiting springs is provided in another part of the machine with short circuiting mechanism by which the break wheel contact springs of the operating box circuit are short circuited during the operation of the box. The non-interference principle in such machines has been obtained by a delicately constructed and complicated arrangement of mechanical and armature mechanism by which the successful operation of the machine depends upon the response of mechanism to the difference in time in the magnetization or movement of the armatures of the different magnets in the machine in the same circuit. In another class of machines of this character, the results are obtained with a single pair of magnets for each circuit, but each magnet is provided with a main armature which when it drops away from the magnets requires mechanical appliances to restore it again and it is further provided with an auxiliary armature connected with a delicately balanced lever that is adapted to catch the main armature under certain conditions while being sluggish enough under normal conditions not to catch the quicker acting main armature which is retracted by a spring. In this class of machines, main circuit wheel devices are retained as in the other machines.

Now the object of this invention is to simplify the general construction of mechanism requisite for this service, to reduce the solution of the electrical problem to its simplest mechanical form and to dispense with the necessity of having differential time armature devices heretofore thought necessary.

This invention consists therefore in such an arrangement of the armatures, circuit terminals, short circuit and cut out mechanism with relation to each other, and the mechanism required to operate the same of such new design and construction, that—the break wheel mechanism—the extra magnet for each circuit—the auxiliary armature devices with their differential time requirements and the special short circuiting springs—as found in other machines can be dispensed with and the required results attained with a single magnet and armature and a single pair of circuit terminals for each circuit.

This invention further consists in details of construction that will be described hereinafter.

The drawings show a machine intended for two box closed circuits and one open alarm circuit but it can be seen that by duplicating the mechanism shown as necessary for a single circuit, the machine can be adapted to a larger number of circuits, and the principle of operation will be the same as exists between the circuits here shown.

Figure 2:
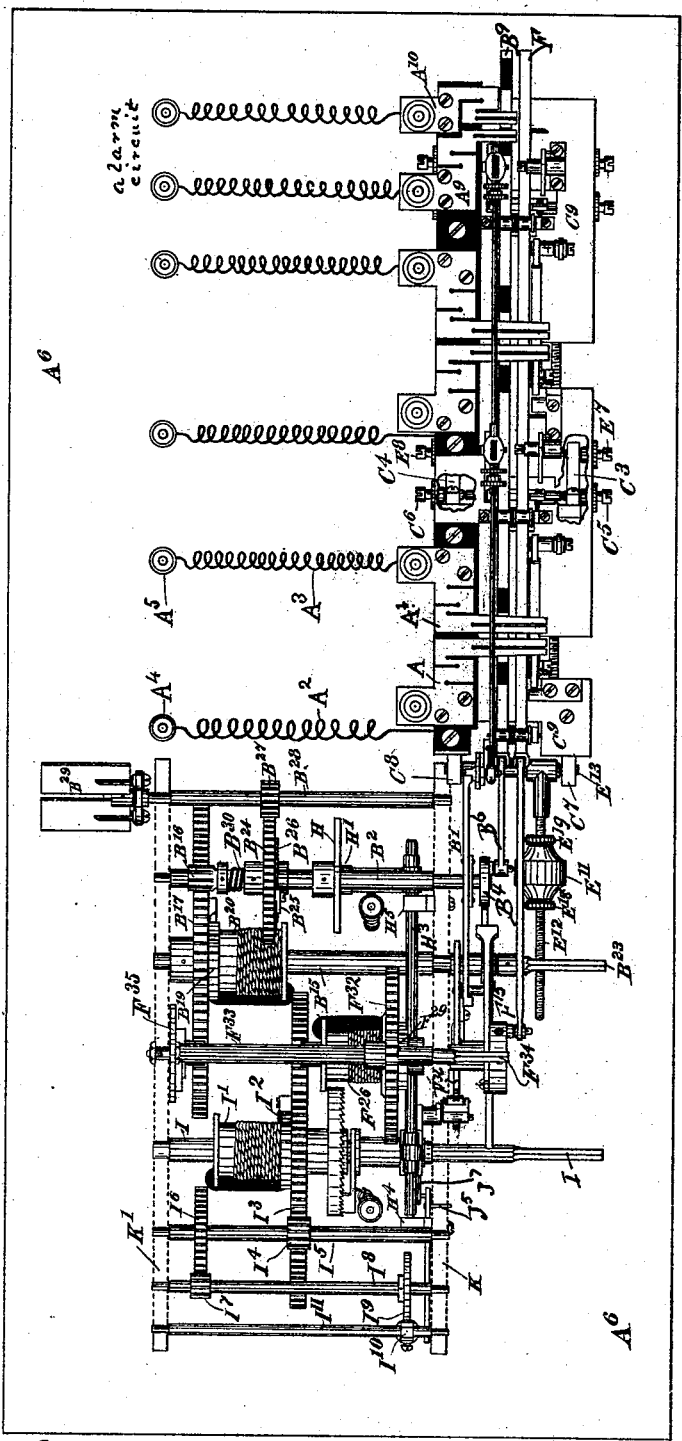
Figure 3:
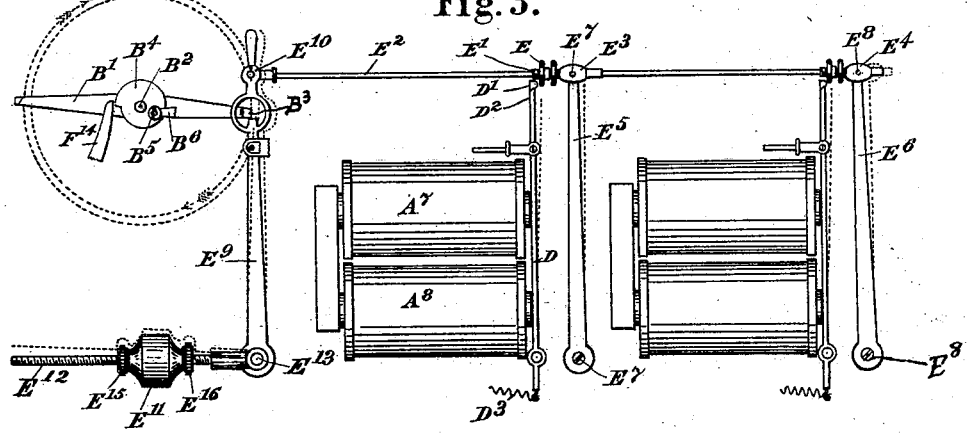
Figure 4:
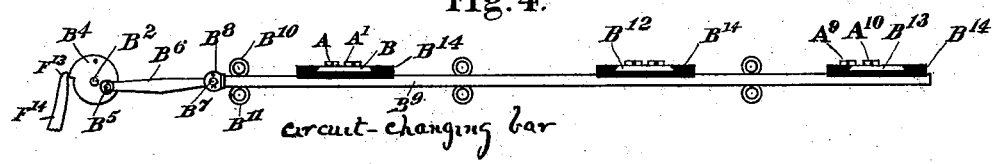
Figure 5:
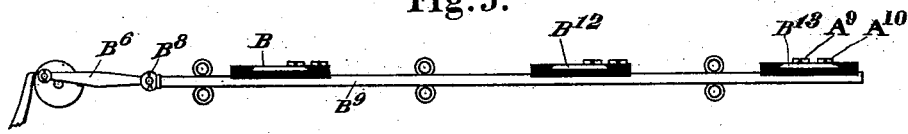
Figure 6:
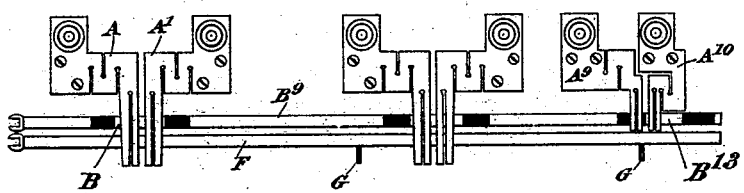
Figure 7:
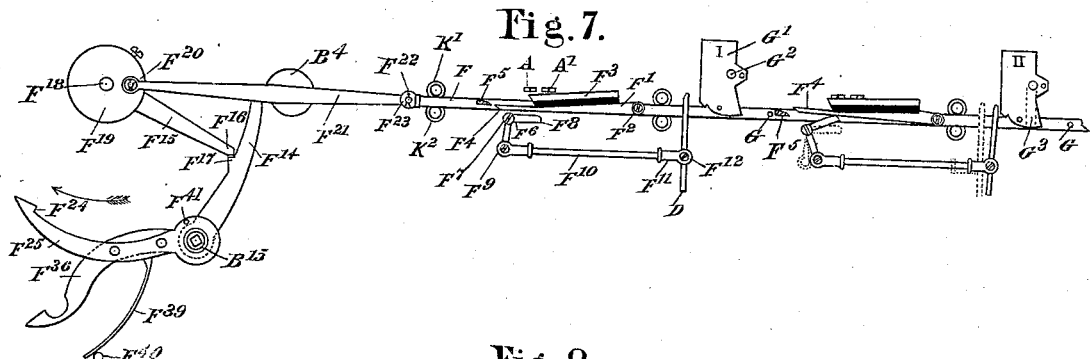
Figure 8:
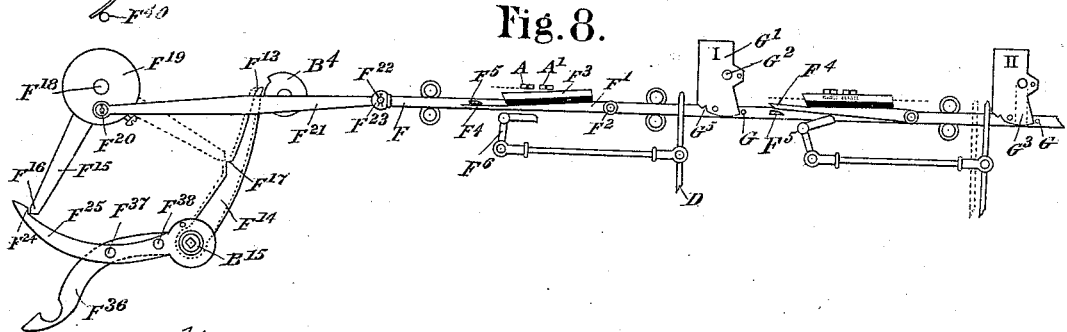
Figure 9:
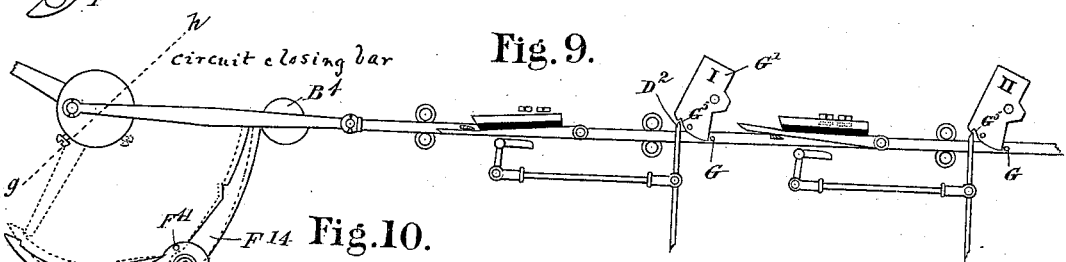
Figure 10:
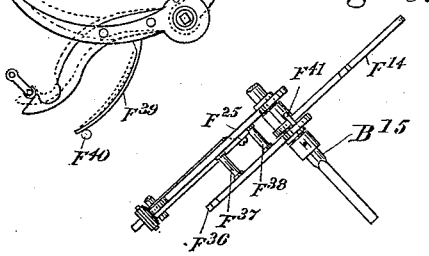

Figure 1. represents a front elevation of the machine, the front plate of the mechanism being removed for purposes of clearness. Fig. 2. represents a top view of Fig. 1. Fig. 3. shows a front elevation of the armature and escapement mechanism. Fig. 4. represents a front view of the circuit changing bar and circuit terminals in their normal condition. Fig. 5. shows a front view of the circuit changing bar and circuit terminals in an open circuit position which the former assumes during the operation of a signal. Fig. 6. shows a top view of the circuit terminals when in normal position with relation to the circuit changing bar and the parallel circuit closing bar. Fig. 7. shows a front view of the circuit closing bar mechanism with its escapement lever mechanism and the armature connection with the circuit closers and locking up devices when the circuit closing bar is in its normal position. Fig. 8. shows the circuit closing bar mechanism in the position it assumes during the transmission of a signal through the machine. Fig. 9. shows the circuit closing bar mechanism after the machine has completed the transmission of a signal and is in the act of assuming its normal position again as shown in Fig. 7. It also shows how the armature mechanism of a disabled or opened circuit becomes locked up. Fig. 10. shows a plan view of the detent mechanism of the circuit closing bar on the line $g. h.$ in Fig. 9. Fig. 11 shows a front view of the rock bar mechanism by which the detent mechanism of the circuit closing bar is actuated. Fig. 12. shows a side view of Fig. 11. Fig. 13. also shows a side view of Fig. 11. after the cam has caused the clutch to separate from the clutch wheel which it does during the transmission of every signal through the machine. Fig. 14. shows a reverse side view of the clutch and clutch wheel referred to in Fig. 13. Fig. 15. shows a full size front view of the tripping mechanism connected with the clutch device just about to actuate the detent mechanism of the circuit closing bar. Fig. 16. shows in full size the tripping device in its normal position when the machine is at rest, and after having released the detent lever of the circuit closing bar more plainly seen in Fig. 9. Fig. 17. shows in full size the tripping device in the act of leaving its normal position from the detent mechanism when the machine makes its first signal, and taken together with Fig. 15. shows its range of motion. Fig. 18. shows a top plan view of the tripping mechanism while in the position shown in Fig. 16. Fig. 19. shows a front view of the tripping mechanism in the position which it assumes immediately after it has been released by the cam from its normal position shown in Figs. 11. and 16. This figure also shows how the stop mechanism which controls the movement of the pallet lever mechanism of the machine is released and allows the clutch wheel work to revolve and again carry the tripping mechanism forward toward its normal position as shown in Fig. 11. Fig. 20. shows a top view of the armature retracting spring adjustment. Fig. 21. shows a full sized vertical section of the circuit changing bar and circuit closing bar mechanism on the line $a. b.$ in Fig. 1. Fig. 22. shows a full sized vertical section of the circuit changing bar and circuit closing bar mechanism on the line $c. d.$ Fig. 1. It also shows the position of the circuit closer after having been raised up by the movement of the armature mechanism and brought forward by the circuit closing bar over its guide, so as to thereby lift the terminal springs clear of the circuit changing bar. Fig. 23. is a full sized vertical sectional view of the upper end of the armature and trip rod mechanism and also the armature locking up device, on the line $e. f.$ Fig. 1. Fig. 24. is a full sized front view of the armature connections with the circuit closer in which the exact relative positions of these devices are shown. It also shows the exact size and relative positions of the armature and trip rod mechanism, as well as the locking up device, all being in their normal position as shown in Fig. 1.

Similar letters refer to similar parts throughout the several views.

The mechanism necessary to make each of the two circuits for which the machine is adapted operative is exactly the same, so it will be sufficient to describe the mechanism shown as necessary for a single circuit.

A. A'. represent terminal springs of a closed fire alarm box circuit with which they are connected by means of the wires $A^2. A^3.$ and binding posts $A^4. A^5.$ to the base $A^6.$ of the machine. The connection between terminal A. and the wire $A^2.$ instead of being direct like that of the terminal A'. and the wire $A^3.$ is through the pair of magnets $A^7. A^8.$ so as to bring them into circuit, so that when the circuit changer B. is in close contact with the terminals A. A'. as seen in Figs. 4. and 6. a closed circuit is established between the posts $A^4$. $A^5$. through the magnets when they are brought directly into the main fire alarm box circuit connected with the posts $A^4$. $A^5$. The magnets are mounted in standards C. C'. which are secured to the bottom plate $C^2$. and are provided with lugs $C^3$. $C^4$. having armature pivot screws $C^5$ $C^6$. upon which the armature D. is trunnioned. The upper part of the armature D. is extended above the magnets and is provided with two fingers D'. $D^2$. (see Figs. 23 and 24), the former of which is adapted to impinge against an adjusting nut E. on the threaded portion E' of the trip rod $E^2$. The trip rod $E^2$. is provided with knuckle-jointed connections $E^3$. $E^4$. to the vertical pivoted links $E^5$. $E^6$. (Fig. 3) which are trunnioned upon the pivot screws $E^7$. $E^8$. which are in the armature pivot lugs and horizontal and parallel with the armature pivot screws.

$E^9$. represents a detent lever having a knuckle jointed connection $E^{10}$. with the trip rod $E^2$. It is trunnioned in the lugs $C^7$. $C^8$. Fig. 1 in the same plane with the armature and link pivots which gives the detent lever, the trip rod links and the armatures a parallel motion and enables an armature in its recession movement from the poles of its magnet to impart its motion in a simple and direct manner to the detent lever and thereby allow the escapement lever B'. which is connected with the shaft $B^2$. to make a half revolution, as indicated by the arrows in Fig. 3. The retracting spring $D^3$. causes the armature to recede from the magnet when the magnet is demagnetized and its tension is regulated by means of the slide $D^4$. on the screw $D^5$. and nuts $D^6$. $D^7$. (See Fig. 20.) The nuts $D^8$. $D^9$. are for the purpose of securing the screw $D^5$. between the standards C. C'. which arrangement provides a convenient manner of inserting and removing the retracting spring device without otherwise separating the other parts of the machine. The forward motion of the armatures is effected by the magnetization of the cores of the magnets in the usual manner of armature mechanism.

The forward motion of the detent lever $E^9$. is attained by the gravity of the counterpoise $E^{11}$. upon the screw $E^{12}$. having a horizontal position and being connected with the detent lever shaft $E^{13}$. upon which the detent lever is trunnioned. The weight of the counterpoise is intended to overcome the friction of the trip rod bearings and that of the end $B^3$ (Fig. 24) of the escapement lever B'. upon the seat $E^{14}$. of the detent lever. The extreme motion of the detent lever in each direction is limited by the pin $E^{15}$, which plays in the hole $E^{16}$. of the limiter $E^{17}$. which is secured to the standard C. The position of the counterpoise upon the screw is secured by means of the check nuts $E^{18}$. $E^{19}$. The cam $B^4$ is secured to the shaft $B^2$. and is provided with a crank pin $B^5$. for a short pitman $B^6$. (Figs. 4 and 5) having its other end connected by means of a wrist pin $B^7$. to the end $B^8$. of the circuit changing bar $B^9$. This bar $B^9$. is mounted in pairs of flanged guide rollers $B^{10}$. $B^{11}$. which are secured to the top plate $C^9$. To this bar $B^9$. insulated circuit changers B. $B^{12}$ $B^{13}$. are secured through the rubber blocks $B^{14}$. $B^{14}$. $B^{14}$. in such a position with reference to their terminal springs as to cause the circuit in which said springs are placed to be opened or closed at each reciprocation of the bar which is effected by the revolution of the cam $B^4$. This motion is clearly illustrated in Figs. 4, 5, and 6.

The necessary rotary motion of the shaft $B^2$. with the cam $B^4$. is attained from a suspended weight through a train of wheel work that will be hereinafter described. One of the ends of escapement lever B'. is longer than the other as indicated by the dotted line in Fig. 3. and the crank pin $B^5$. is placed in such relation with the escapement lever as that when an armature falls away from the poles of its magnet the detent allows the cam to make a half revolution and the circuit changing bar immediately assumes the position shown in Fig. 5. and remains in that position until the armature moves up to the poles of the magnet again when the shaft $B^2$. will make another half revolution and bring the circuit changing bar to its normal position again as shown in Fig. 4. A circuit changer $B^{13}$. is placed in such a manner with relation to the circuit terminals $A^9$. $A^{10}$. as to close the circuit when the two box circuits are opened and vice versa, this arrangement being intended for signaling over a special open alarm circuit to any alarm mechanism that may be placed therein.

The manner in which the circuit changing bar breaks and closes the circuits and the way in which its movements are controlled by the movement of an armature through the trip rod and the detent lever mechanism can from the foregoing be understood without further description.

Parallel with and adjacent to the circuit changing bar $B^9$. is placed another bar F. which is mounted upon rollers K', $K^2$, Fig. 7. and similar to the circuit changing bar $B^9$. and having a similar reciprocating motion. The functions of this bar F. are three-fold, namely:— First, it must cause the circuit closer for the operating box circuit to close the circuit between the circuit terminals so that the only breaks in the circuit are those caused by the circuit wheel of the signaling box, in other words to short circuit the circuit changer for the operating circuit; secondly, it must temporarily lock up the armature of the non-operating circuit so that any breaks that may occur in that circuit while the signal was being received from the operating circuit would not interfere with it; thirdly, it is intended to lock up the armature in a broken or disabled circuit and allow it to remain in that condition until the circuit is again restored when it is automatically brought into service again.

The short circuiting feature is effected as follows: A wedge shaped lever $F'$. is pivoted at one end upon a pivot $F^2$. in the bar $F$. which allows its free end to have a short vertical motion parallel with the bar, its motion being limited by the top plate $C^9$. upon which it rests normally and the circuit terminals $A$. $A'$. against the under side of which an insulated metallic circuit closer $F^3$. which is secured thereon impinges. In front of the free end $F^4$. of the circuit closer a guide $F^5$. is placed which is screwed to the top plate $C^9$. of the machine. Directly under the lever $F'$. is placed a bell crank lever $F^6$, pivoted to the upper plate $C^9$. of the machine upon the screw $F^7$. the upper end $F^8$. of which is adapted to lift the lever $F'$. so as to cause the end $F^4$. of the lever to rise above the guide $F^5$. and to bring the circuit closer $F^3$. against the terminal springs as shown in Fig. 7. The lower end $F^9$. has a knuckle-jointed connection with the connecting rod $F^{10}$. which is connected at its other end $F^{11}$. by means of the pivot $F^{12}$. to the armature $D$. By this arrangement, the movement of the armature is transferred to the lever $F'$. which causes the latter to rise above the guide and against the terminal springs, as indicated in Fig. 7. whenever the armature drops away from the cores of the magnet, and when the machine is in its normal position ready to give a signal. It will thus be seen that the circuit closers $F^3$ have two different movements, one that of vibration, about their pivots $F^2$, and the other that of translation, being carried by the bar $F$ through the backward movement of the armature, as above described. This backward movement of the armature, however, causes the circuit changing lever mechanism to operate including the rotation of the cam $B^4$. against which the free end $F^{13}$. of a detent lever $F^{14}$. rests, its lower end being pivoted loosely on the main shaft $B^{15}$ of the train of wheel work which rotates the cam.

When the machine is in its normal condition the relative positions of the end $F^{13}$. of the detent lever and the cam $B^4$. are shown in Figs. 3. and 4, but when the main detent lever $E^9$. is moved backward by the trip rod and armature mechanism which releases the escapement lever $B'$. and allows the cam shaft to revolve the end of the lever falls against the small part of the cam as shown in Fig. 8, and this movement releases an escapement lever $F^{15}$. the end $F^{16}$. of which rests against the seat $F^{17}$. upon the detent lever $F^{14}$. when in the normal condition shown in Fig. 7. The toe of this lever and the seat upon which it rests are slightly beveled thereby enabling the lever $F^{14}$. to drop back freely when the cam in its rotation allows it to do this.

The lever $F^{15}$. is secured upon the shaft $F^{18}$ with a crank wheel $F^{19}$. having a crank pin $F^{20}$. to which one end of the pitman $F^{21}$. is fitted, its other end being connected by wrist pin $F^{22}$. to the end $F^{23}$. of the circuit closing bar $F$. The shaft $F^{18}$. is made to revolve by a weight suspended by a cord from a drum seen in Figs. 1. and 2. and which will be more fully described hereinafter. It can therefore be seen that the revolution of the shaft $F^{18}$. imparts to the circuit closing bar $F$. a reciprocating motion similar to that provided for the circuit changing bar already described, and immediately upon the movement of the cam $B^4$. in response to a signal shaft $F^{18}$. makes a quarter revolution when its further motion is arrested by reason of the end $F^{16}$. of the escapement lever $F^{15}$. coming against the seat $F^{24}$. of a horizontal detent lever $F^{25}$. which is also pivoted on a main shaft $B^{15}$. and loosely like the detent lever $F^{14}$. as shown in Fig. 8. This forward movement of the circuit closing bar $F$. causes the free end of the lever $F'$. to pass under or over the guide $F^5$. according as it may be down or be thrown up by the action of the armature as illustrated in Fig. 8.

The shaft $F^{18}$. and consequently the circuit closing bar with its short circuit closers will remain in the position shown in Fig. 8. while a signal is being transmitted by the machine and at the conclusion of which the detent lever $F^{25}$ is depressed as indicated by the dotted lines in Fig. 9. which will be more fully described hereinafter and allows the shaft $F^{18}$. to complete its revolution through the position shown in Fig. 9, back to the position shown in Fig. 7. again.

While a signal is coming in from a signal box or as I term it over an operating circuit through the machine the circuit closing bar $F$. will remain in the condition shown in Fig. 8. in which the right hand section of the figure represents that to which the operating circuit is connected while the left hand section represents that belonging to the non operating circuit. In this figure, it can be seen that the terminal springs of the operating circuit are raised up clear of the circuit changer as indicated by the dotted lines and the circuit changer short circuited by the circuit closer so that the movement of the circuit changer will have no effect upon the circuit which is operated by the circuit wheel mechanism of the box alone. The movement of the armature has no effect upon the circuit closer while in this position as the latter is supported by the free end of the lever resting upon the guide. By this arrangement it can be seen, that the connection between the armature through the bell crank lever with the circuit closer lever is loose or separable and allows the armature to move freely in each direction in response to the signals, but by referring to the left hand section of Fig. 8. it can also be seen that on account of the circuit closer lever passing under the guide its upper motion in response to the movement of the armature and bell crank mechanism is thereby prevented and the armature is allowed but a very slight movement corresponding to the space between the bell crank lever and the circuit closing lever when the latter has passed under the guide which can be better judged by referring to Fig. 24. in which the exact dimensions and relations of the several parts are shown. In Fig. 8. it can also be seen that in the non-operating circuit the circuit closer does not touch the terminal springs but allows the latter to rest upon the circuit changer so that the movement of the latter breaks and closes the circuit with each corresponding break or closure in the operating circuit when the motor mechanism of the machine gives the circuit changing bar and the circuit closing bar their proper movement.

Fig. 21. shows how the circuit terminals rest upon the circuit changer and the circuit closer will be locked down and the movement of the armature thereby limited by passing under its guide in the case of a non-operating circuit—while Fig. 22. shows the circuit closer resting upon the guide and having raised the terminal springs clear of the circuit changer in the case of the operating circuit, thus short circuiting the circuit changer. At the conclusion of a signal the circuit closing bar is thrown through the position shown in Fig. 9. back to its normal position again as shown in Fig. 7. when the circuit closers resume their position as shown in Fig. 1.

To lock up the armature of a disabled or open circuit the following described devices are employed: Small pins G. G. are secured to the bar F. and projecting laterally therefrom. To the left of each of these pins a vertical cam or block G'. is placed being loosely pivoted by the pivot $G^2$. upon a small standard $G^3$. shown in Figs. 1 and 23. In the same plane as that in which the pin G and the lower part of the cam G'. move and in front of the cam (see Fig. 23) the armature finger $D^2$ projects so that when the bar F moves forward (that is to the left in Figs. 1, 7, 8, and 9,) it brings the pin G. against the edge $G^4$ of the cam and causes the cam to swing over against the armature finger $D^2$. and causes the armature to be moved up to the poles of the magnet. The movement of the bar F. consists of two parts, the first part being that which it makes immediately after the reception of the signal when it changes from the position shown in Fig. 7. to the position shown in Fig. 8. and in which latter position it remains during the transmission of a signal—that is, during the three or four rounds of impulses which the signal box mechanism sends in over the operating circuit.

It will be noticed by referring to Fig. 7. that the pin G. is a short distance from the edge of the cam, about half an inch (see Fig. 24.) so that when the circuit bar makes its first movement from the position shown in Fig. 7. to the position shown in Fig. 8. the pin merely moves forward to the cam without moving the latter from its normal or vertical position so that while the cam is in this position the free movement of the armature is in no way interfered with, and the armature belonging to the operating circuit is free to respond to the signal and move the trip rod mechanism with each break in the circuit. But when the box has completed its signals the escapement lever $F^{15}$. is liberated by the depression of the horizontal detent lever $F^{25}$. as will be hereinafter described and the second movement of the bar F. is made which consists in going from the position shown in Fig. 8. through the position shown in Fig. 9 to the normal position shown in Fig. 7. the shaft $F^{18}$. making three quarters of a revolution, while in the first movement it only makes a quarter revolution. This shaft $F^{18}$. rotates rapidly as the power which moves it has only to overcome the inertia and friction of the parts.

In passing through the position shown in Fig. 9. the pin G. pushes the cam G'. forward against the armature finger $D^2$. and causes the armature to be moved up against the core of the magnets as already stated. But before this second movement of the bar F. takes place the signal box shall have completed its signal and all the circuits will be closed through the magnets and the armatures will be up against the cores so that the cams will swing clear of the armature fingers as indicated by the dotted line in Fig. 24. and when the bar F. completes its movement that is moves back again to the position shown in Fig. 7. the cams will drop from the temporary oblique position which they were caused to assume by the pins G. G. as shown in Fig. 9. to the vertical position shown in Figs. 7. and 8.

When a circuit shall have been disabled by the cutting of its wires, a weak battery or the like, its armature will drop back from the magnet just as it does when a signal comes in. This causes the machine to operate the same as though a signal was being transmitted through the machine—that is, the bar F. will be thrown into the position shown in Fig. 8. but it will remain in that position only a few seconds when the horizontal detent lever $F^{25}$. will be depressed by the tripping device when the bar will instantly move through the position shown in Fig. 9. to the position shown in Fig. 7. Now, through all this time, the armature lever of the disabled circuit will be held back by its retracting spring in the position shown by the full lines in the right section of Figs. 7. and 8. and when it is being pushed forward toward the magnet it will be still pressing against the cam and finally drop back into the notch $G^5$. in the edge of the cam. In this position the cam cannot drop into its vertical position as the tension of the armature against the notch in the edge of the cam prevents it from so doing, nor can the armature come against the trip rod nut E. because the space between the armature finger and the trip rod nut is too great to allow the nut to strike the armature while in this position. (See Fig. 24.) In other words any subsequent reciprocations of the trip rod mechanism that might be caused by a signal coming in over the other circuit after the armature of a disabled circuit is thus locked up cannot free the locked up armature because the trip rod nut does not move far enough forward to strike the locked up armature so that the armature will remain in this condition until it is moved toward the poles of the magnets which happens the instant the magnet is magnetized again by the closing or restoration of the disabled circuit to its normal condition. Therefore, when the circuit is closed the armature moves up to the magnet as shown in Fig. 24 when the finger $D^2$. leaves the notch in the cam and allows the latter to drop down by gravity into its normal or vertical position again and the circuit is ready for service again.

The pin $G^6$. in the cam $G'$. impinges against the side of the standard $G^3$. which limits the extreme movement of the cam in one direction, while another pin $G^7$. limits its extreme motion in the other direction, by also coming against the other side of the standard. The front edge $G^8$ of the cam also serves to limit the movement of the armature when it falls back from the magnet. The pivot $G^2$. is above and to the right of the center of gravity which causes the cam to drop into the vertical position as already indicated. The upper part of the cam has a numeral imprinted thereon to designate the circuit to which the section of the mechanism belongs, and if a cam should be in the oblique position shown in Fig. 9. it would indicate to the attendant that a circuit was disabled and required attention.

The motor mechanism of the machine which actuates the circuit changing bar mechanism and short circuit bar mechanism which has been referred to will now be described:— Shaft $B^2$. which imparts its motion to the circuit changing bar is provided with a pinion $B^{16}$. which engages with the gear $B^{17}$. upon the shaft $B^{15}$. upon which it is loosely mounted and which receives motion through the pawl $B^{18}$. from the ratchet wheel $B^{19}$. of the drum $B^{20}$. and to which the cord $B^{21}$. having the weight $B^{22}$. is connected. One end $B^{23}$. on the shaft $B^{15}$. is squared so that the weight may be wound up by means of a key or wrench. A gear $B^{24}$. is loosely mounted upon the shaft $B^2$. having a pawl $B^{25}$. secured thereto which plays into the teeth of a ratchet wheel $B^{26}$. which is secured to the shaft $B^2$. and the edge of which may be seen in Fig. 2. This arrangement of pawl and mechanism is similar in principle to that of the gear $B^{17}$. and wheel $B^{19}$. and can be readily understood without further illustration. The gear $B^{24}$. engages with a pinion $B^{27}$. on the shaft $B^{28}$. which has a fan mechanism $B^{29}$. secured thereto similar to those found in the well known form of clock movements and needs no further description. The object of this fly shaft mechanism is to retard the cam shaft in its movement so as to give the circuit changing bar mechanism a comparatively slow and easy motion and to prevent undue concussion of the escapement lever $B'$. against the detent lever $E^9$. When the motion of the shaft $B^2$. is thus suddenly arrested by the escapement lever $B'$. coming against the detent lever $E^9$. the motion of the fly shaft is not immediately arrested but the shaft makes one or two revolutions on account of the pawl slipping around over the teeth of the ratchet wheel $B^{26}$. on the shaft $B^2$. A spring $B^{30}$. upon the shaft $B^2$. presses the gear $B^{24}$. against the ratchet wheel $B^{26}$. thereby giving the wheel a frictional grip of the shaft, and which prevents the unnecessary revolution of the fly shaft. The movement of the center shaft $F^{18}$. which actuates the circuit closing bar is obtained by a drum $F^{26}$. which is loosely mounted thereon and to which a gear wheel $F^{27}$. having a ratchet mechanism $F^{28}$. which plays in a ratchet wheel $F^{29}$. which is secured to the shaft. The cord $F^{30}$. is secured to the drum $F^{26}$. and has a weight $F^{31}$. suspended therefrom. The gear $F^{27}$. engages with another gear $F^{32}$. mounted upon the shaft $F^{33}$. the outer end $F^{34}$. of which is squared to admit of winding with a key or the like. By this arrangement the weight $F^{31}$. may be wound up and through it the necessary motion imparted to the circuit closing bar as already described. The stop wheel device $F^{35}$. is to prevent the excessive winding up of the shaft $F^{18}$.

The tripping mechanism which trips the detent lever $F^{25}$. and thereby allows the circuit closing bar mechanism to make its second movement as already referred to will now be described:—Upon the shaft $B^2$. a cam H. (Figs. 11 and 12) is secured which is adapted to play upon the roller $H'$. which is fitted upon the arm $H^2$. which is secured to the rock shaft $H^3$. which is provided with journals $H^4$. $H^5$. (Fig. 1) which are screwed to the front plate of the machine. A fork shaped arm $H^6$. is also attached to the rock shaft $H^3$. and at a right angle with the horizontal arm $H^2$. By this arrangement the vertical motion of the arm $H^2$. which is imparted to it by the action of the cam H. through the roller $H'$. is converted into a horizontal motion by the arm $H^6$. The free end of the arm $H^6$. plays against two collars $H^7$. $H^8$. of a sleeve $H^9$. which is loosely fitted upon the shaft I. Upon one end of the sleeve $H^9$. a clutch $H^{10}$. is secured the end $H^{11}$. of which is adapted to play against the teeth of a clutch wheel $H^{12}$. in the manner of the well known clutch mechanism. To the other end of the sleeve $H^9$. an arm $H^{13}$. is secured having a stud $H^{14}$. upon which the trip $H^{15}$. is loosely pivoted and having a roller $H^{16}$. at its free end. A stop pin $H^{17}$. limits the extreme free movement of the trip to an arc of about ninety degrees, by striking against shoulders $H^{18}$. $H^{19}$. of the stud $H^{14}$. By this arrangement the rotation of the shaft I. with the clutch wheel $H^{12}$. which is rigidly secured to it and whenever the clutch is in connection with the latter causes the trip $H^{15}$. to move against the horizontal trip lever $F^{36}$. which depresses the latter as indicated in Fig. 9. and thus releases the escapement lever $F^{15}$. of the circuit closing bar mechanism. The clutch $H^{10}$. is normally held against the clutch wheel by the tension of the spring $H^{20}$. the lower end of which is connected with the arm $H^2$. by the pin $H^{21}$ (Fig. 11). Another spring $H^{22}$. is secured to the clutch $H^{10}$. the tension of which is adapted to move the clutch around from the position shown in Figs. 1. and 11. to the position indicated in Fig. 19. whenever the cam H. depresses the arm $H^2$. and thereby draws the clutch away from the clutch wheel as indicated in Fig. 13. A drum $I'$. is secured upon the shaft I. having a ratchet wheel $I^2$. against which a pawl mechanism of the gear $I^3$. plays, similar in construction to the ratchet mechanism of the other winding shaft as already described. The gear $I^3$. is loosely fitted upon the shaft I. and is controlled in its motion by the train consisting of pinion $I^4$. shaft $I^5$. wheel $I^6$. pinion $I^7$. shaft $I^8$. escape wheel $I^9$. pallet $I^{10}$. upon the shaft $I^{11}$. and by which its time may be regulated by the proper adjustment of the weight $I^{12}$. upon the pendulum rod $I^{13}$. Pivoted upon the front frame plate K of the machine is a lever J. (Fig. 19) having two pins $J'$. $J^2$. projecting laterally therefrom. Pivot $J^3$. is nearer to one end of the lever than to the other which causes the outer end $J^4$. to drop down by gravity when free to do so as indicated by the full lines in Fig. 19. A small pin $J^5$. plays in the hole $J^6$. in the frame of the machine which limits the extreme motion of the lever in both directions. A starting pin $J^7$. which projects from the sleeve $H^9$. is adapted to impinge against the pin $J^2$. in the lever J. and cause the outer end of the latter to bring the pin $J'$. against the end of the pendulum rod $I^{13}$. as indicated in Fig. 1. and by the dotted lines in Fig. 19. and thereby stop the oscillations of the pendulum rod and consequently the gear $I^3$. which moves the clutch wheel $H^{12}$.

Whenever the machine responds to the first impulse of a signal the cam H. through the rock bar mechanism draws the clutch away from the clutch wheel and the sleeve mechanism is immediately brought from the position indicated in Figs. 1. and 11. to the position shown in Fig. 19. by the tension of the spring $H^{22}$. The lever J. being thereby released drops down and the train is allowed to revolve on account of the release of the pendulum rod its rotation being caused by the cord $H^{23}$. which is secured upon the drum $I'$ which has a weight $H^{24}$. attached thereto. The clutch wheel train is so timed as to cause the trip mechanism to travel from the position shown in Fig. 19. to the position shown in Fig. 11. in a slightly greater length of time by a few seconds than the interval of time that elapses between the rounds of a signal so that the trip is never carried as far forward toward the horizontal lever $F^{36}$. as indicated by the position shown in Fig. 15. while the different rounds of the signal are being repeated by the machine; but when the last round of the signal is completed the trip is then carried forward by the clutch wheel to the position indicated in Fig. 9. and thence to the position shown in Fig. 11. when the stop lever J. is brought up against the pendulum rod and the train is stopped in its rotation. With every impulse of a signal through the machine the cam H. makes a revolution as has been already stated which causes the clutch to be drawn out from the clutch wheel and after which it always moves back to the position shown in Fig. 19. again; and even during the intervals between rounds it only moves forward an arc of a few degrees, as for instance to the position indicated by the dotted line in Fig. 19. when the beginning of the next round of signals causes the clutch to be again released when it is again thrown back. So it can be seen that by this arrangement the initial impulse of the signal releases the clutch mechanism from the clutch wheel and it moves from the position shown in Fig. 11. to the position shown in Fig. 19. and while the signal is being given by the machine the trip is being alternately carried forward and thrown backward again by the subsequent movements of the cam H. until the signal is complete when the trip then moves forward until it releases the escapement lever $F^{15}$. thereby allowing the circuit closing bar F. to assume its normal position again as indicated by Fig. 7. and afterward raising the stop lever J. so as to stop the movements of the pendulum and consequently the rotation of the clutch wheel. When a break in the line occurs it actuates the clutch mechanism just the same as the initial impulse of a signal does when the trip is carried forward as at the termination of a regular signal and the horizontal lever $F^{36}$. is depressed and the escapement lever $F^{15}$. released as in the other case; but while the circuit bar mechanism is going through the position shown in Fig. 9. the locking up cam $G'$. locks up the armature of the disabled circuit in which position it remains until the circuit is restored again while the circuit closing bar mechanism has in the meantime, moved back to its normal position as shown in Fig. 7.

The object of the loosely pivoted construction of the trip $H^{15}$. is to enable it to pass away from the horizontal lever $F^{36}$. without depressing it as shown in Fig. 17 where the trip is shown as being lifted up when the clutch mechanism is about to move over to the position shown in Fig. 19. upon the reception of an initial impulse of a signal.

It is desirable not to depress the horizontal lever $F^{36}$. so that the detent lever $F^{25}$. may be up and ready to arrest the movement of the lever $F^{15}$. which occurs upon the initial impulse of the signal.

The levers $F^{25}$. and $F^{36}$. are secured together rigidly by means of two posts $F^{37}$. $F^{38}$ so that both levers move as though made in one piece and being loosely pivoted upon the shaft $B^{15}$. with the lever $F^{14}$. which is also pivoted on the same shaft playing loosely between them.

A flat spring $F^{39}$ is attached to the lever $F^{25}$. its free end resting against a stud $F^{40}$. which is in the front frame plate of the machine. This spring keeps the levers $F^{25}$. $F^{36}$. up in their normal position but yields to the pressure of the trip when the latter depresses the lever $F^{36}$. The pin $F^{41}$. in the lever $F^{36}$. is to prevent undue forward motion of the lever $F^{14}$.

The frame plates of the machine K. K'. as indicated by the dotted lines in Fig. 2. provide the bearings for the shafts of the motor mechanism. They are secured together by four posts two of which may be seen at $K^2$. $K^3$. in Fig. 1. These posts are provided with adjusting screws $K^4$. $K^5$. by which the tension of the springs $H^{22}$. and $H^{20}$. may be regulated.

To secure the proper adjustment of the magnets with reference to the armatures, a lug L. which is secured to the keeper L.' of the magnets is provided with an adjustment screw $L^2$. which passes through a hole in the standard C. and having the nuts $L^3$. $L^4$. which are adapted to bear against the standard C. and thereby secure the requisite adjustment for the magnets.

The operation of the machine may be described as follows: Two fire alarm closed box circuits are supposed to be connected to the machine through two pairs of magnets as shown and an open alarm bell circuit being also connected to the machine through the terminals $A^9$. $A^{10}$. as seen in Fig. 6. Alarm mechanism may also be placed in either one of the box circuits. The machine when in its normal condition is as shown in Figs. 1. and 2. Now, it will be supposed that an alarm box in the box circuit in which the right hand pair of magnets are placed is "pulled." The break in the circuit will cause the armature to fall away from the magnet as indicated in Fig. 7. This will move the trip rod mechanism to the right as indicated by the dotted lines in Fig. 3. and thereby liberate the escapement lever B'. so as to allow the shaft $B^2$ to make a half revolution which moves the circuit changing bar $B^9$. to the position shown in Fig. 5. thereby breaking the closed circuits by means of the movement of the circuit changers B. $B^{12}$. and closing the open alarm circuit by means of the circuit changer $B^{13}$. thereby giving a signal upon any of the alarm devices that may be placed in either of the closed or open circuits. The instant the armature fell back from the magnet, however, the end $F^4$ of the circuit closing lever became lifted above the guide $F^5$ even before the circuit closing bar F. had commenced its movement, so that when the cam $B^4$ causes the detent lever $F^{14}$. to release the escapement lever $F^{15}$. and thereby allows the shaft $F^{18}$. to move the circuit closing bar F. forward to the position shown in Fig. 8. the end $F^4$. of the circuit closing lever will pass above the guide $F^5$. and rest upon the same thereby lifting the circuit terminals clear of the circuit changer and short circuiting the latter, so as to prevent any movements of the circuit changer from opening the operating circuit at the circuit terminals by the subsequent movements of the circuit changing bar $B^9$. during the reception of the subsequent impulses of the box signal. In this way the signal box circuit breaker will have full control of the circuit while it is giving its signal. That is, there will be no other breaks in the line so far as the repeater is concerned but those given by the circuit wheel of the box. The armature mechanism of the other box circuit will be in a normal condition when the first signal from the operating box comes in or as is indicated in the left hand section of Fig. 7. Therefore when the circuit closing bar F. moves forward it will carry the end $F^4$. of the circuit closer lever under the guide $F^5$. in which position it will be during the transmission of the signal over the operating circuit, as shown in Fig. 8. so that while it remains in this position the armature mechanism is limited in its movements by the locking down of the lever $F^6$. Therefore, any subsequent breaks that might come over that circuit from a box "pulled" in it could not cause the armature to move sufficiently to strike against the trip rod mechanism and thereby cause a confusion of signals. With each closure of the operating circuit during the reception of the box signal the armature of course moves forward to the magnet and the trip rod mechanism being relieved of its pressure moves forward by the gravity of the counterpoise $E^{11}$. which releases the long arm of the escapement lever B'. from contact with the detent lever $E^9$. and allows the escapement lever to make another half revolution or to the position shown in Fig. 3. which brings the circuit changing bar $B^9$. back to its normal position thereby closing the box circuits and opening the alarm circuit. In this way, every break and closure of the operating box circuit are repeated by the machine until the box completes its signal. When the shaft $B^2$. made its first half revolution in response to the initial impulse of the box signal the cam H. depressed the lever $H^2$. which caused the rock bar $H^3$. to draw the clutch $H^{10}$. clear of the clutch wheel $H^{12}$. and the former when thus made free moved around to the position shown in Fig. 19. This movement of the clutch mechanism caused the pin $J^7$. to leave contact with the pin $J^2$. in the lever J. and allowed the latter to drop down from the pendulum rod $I^{13}$. and the latter being released allowed the clutch wheel $H^{12}$. with its train of wheel work to rotate slowly and carry the tripping mechanism forward toward the lever $F^{36}$. The time required for it to complete this movement as has already been stated, is not only greater than the time between strokes or series of strokes of the box signal, but also greater by a few seconds than the interval between rounds of signals and as every impulse of the signal causes the cam H. to make a rotation consequently with every rotation or box impulse the rock shaft mechanism draws the clutch mechanism away from the clutch wheel and allows the tripping device to move back again to the position shown in Fig. 19. The position of the tripping device therefore is as shown in Fig. 19. after the last impulse of the box signal just the same as after the first so that it never reaches the lever $F^{36}$. while the box is giving its signal and consequently the wheel $H^{12}$. with its train slowly rotates constantly during the reception of a signal and the circuit closing mechanism remains in the position shown in Fig. 8. After the last impulse of the signal has been received on the machine, however, the tripping mechanism then moves forward from the position shown in Fig. 19. through the position shown in Fig. 15. and to the position shown in Fig. 11. when the lever $F^{36}$ is depressed, thereby releasing the lever $F^{15}$. and allowing the circuit closing bar to move through the position shown in Fig. 9. back to the normal position again shown in Fig. 1. when the machine is ready for the reception of another signal over either of the circuits. The movement of the circuit changing bar mechanism is comparatively slow on account of the retarding effect of the fly mechanism while the movement of the circuit closing bar mechanism is quick as there is no train connected with the shaft $F^{18}$. and nothing but the inertia of the parts to overcome. Therefore the circuit closing bar mechanism reaches the position shown in Fig. 8. sooner than the circuit changing bar mechanism moves into the position shown in Fig. 5. or when the circuit is broken by the circuit changer in either of the closed circuits so that the circuit closer is carried under the guide $F^5$. before the break in the circuit caused by the circuit changer makes the armature fall away from the magnets. In other words, the circuit closer of the non-operating circuit is locked under the guide $F^5$. before the break caused by the circuit changer in the circuit causes the armature in that circuit to lift up the circuit closer against the circuit terminals as is the case with the circuit closer and armature mechanism of the operating circuit. On account of the crank motion of the circuit changing bar mechanism the breaking of the circuits by the circuit changers occurs only near the end of the stroke. That is when it nearly approaches the position shown in Fig. 5. This feature also increases the interval of time between the time the armature of the operating circuit moves and that at which the armature of the non-operating circuit moves so that there is a comparatively liberal margin of time for the circuit closer of the non-operating circuit to be locked down in before the break caused by the circuit changer in that circuit occurs. Another feature of advantage in this crank motion of both the circuit changing bar mechanism and the circuit closing bar mechanism is that the motor mechanism starts comparatively easy on account of the fact that the cranks start from a position nearly "on the center" which is desirable.

When a line breaks on one of the circuits the whole machine goes through the operation already described just as though it was giving a signal of one stroke. The trip rod mechanism, however, remains in the open circuit position until the tripping device moves forward and releases the escapement lever $F^{15}$. of the circuit closing bar mechanism by the depression of the lever $F^{36}$. as already described. The armature mechanism, however, remains in an open circuit position as indicated in Figs. 7. and 8. pressing against the cam $G'$. until the circuit closing bar mechanism goes through the position shown in Fig. 9. when it moves the cam $G'$. against the armature which pushes the latter forward until it drops into the notch of the cam as shown in Fig. 9. in which position both the cam and armature remain and the armature thereby becomes locked up until the circuit is closed again by the restoration of the broken line when the magnet of the armature pulls the latter forward again and allows it to clear the cam. The latter then drops into the vertical position as seen in Fig. 24.

By the form of construction herein shown and described it will be observed that by making the circuit terminals the central point around which the mechanism requisite to perform the necessary functions of the machine is designed I am enabled to dispense with a special multiple circuit wheel together with a set of contact springs for each wheel;— no auxiliary magnets, or auxiliary armatures are required, and the auxiliary armature differential time locking out devices as found in other machines of this class are entirely dispensed with, and a machine simple in design and operation is produced,—having only one pair of circuit terminals, one pair of magnets and a single armature for each circuit. It will also be seen that in this method of construction the circuit changer of the operating box circuit becomes short-circuited during a signal by means of a circuit closer which is moved against the circuit terminals by the movement of the armature, which I believe to be entirely new in the art of fire alarm telegraphy.

Having thus described my invention, what I claim, and desire to secure by Letters Patent, is—

1. The combination of the circuit changing bar provided with circuit changers, the circuit closing bar provided with circuit closers, and the circuit terminals, substantially as specified.

2. The combination with the circuit terminals of the circuit changing bar provided with circuit changers and having a motor mechanism by which a reciprocating movement may be imparted to the circuit changing bar, and an electro-magnetic device in one of the circuits which controls said motor mechanism substantially as specified.

3. The combination with circuits and the circuit changing bar having a series of circuit changers of a motor shaft having a crank and pitman connection with the bar, means, independent of the circuits, for propelling the shaft, and an electro-magnetic device in each of the circuits, each device being adapted to control said motor shaft substantially as specified.

4. In combination with the circuit terminals, a circuit closing bar, having a circuit closer mounted movably thereon, adapted in one of its positions to close the circuit when the bar is moved, and electromagnetic means in the circuit for moving the circuit closer into its position for closing the circuit when the bar is moved, substantially as described.

5. The combination of the circuit closing bar having circuit closers movably mounted thereon adapted when in certain positions relative to the bar to close the circuits as the bar is moved, and guides for holding the circuit closers in position after the movement of the bar, substantially as described.

6. The combination of the circuit closers having a movement of translation and also of vibration, the armatures adapted to operate the circuit closers, and the guides adapted to limit the vibratory movement of the circuit closers after the completion of the movement of translation, substantially as described.

7. In combination with a motor shaft of a circuit changing bar mechanism a cam an escapement lever secured to the motor shaft of a circuit closing bar mechanism and a detent lever for the escapement lever to play against which is controlled in its movement by the movement of the motor shaft cam, substantially as specified.

8. In combination with the motor shaft of a circuit closing bar mechanism having an escapement lever, a detent lever for the escapement lever to play against, a tripping lever secured to the detent lever and a tripping device provided with a motor mechanism and adapted to depress the tripping lever and thereby cause the release of the motor shaft mechanism, substantially as described.

9. In combination with the motor shaft of a circuit changing mechanism having a cam thereon, a clutch wheel provided with a motor mechanism, a sleeve having a clutch adapted to engage with the clutch wheel and also having a tripping device adapted to release a circuit closing shaft mechanism and a rock shaft provided with a lever to move the clutch from the clutch wheel and also having an arm upon which the cam plays and thereby moves the clutch from the clutch wheel at each revolution of the cam, substantially as specified.

10. In combination with a series of circuit terminals a bar provided with circuit changers and another parallel bar provided with loosely connected circuit closers for the circuit terminal, substantially as described.

11. In combination with a series of pairs of circuit terminals, a bar provided with motor mechanism by means of which a reciprocating motion may be imparted to it and having a circuit changer for each pair of terminals and another parallel bar also provided with a motor mechanism by which a reciprocating motion may be imparted to it and having a loosely connected circuit closer for each pair of terminals that is adapted to be brought against the terminals and thereby close the circuit between said terminals, substantially as described.

12. The combination with a motor shaft and a pivoted detent therefor, of the pivoted armatures, and the trip rod mounted upon pivoted links, and adapted to be actuated by the armatures, the pivotal axes of the detent, the armatures, and the links being parallel with each other and in the same plane, substantially as described.

13. The combination of the circuit closing bar having a locking up pin, a cam adapted to be moved by the circuit closing bar against the armature and the armature which becomes locked up by the cam, substantially as specified.

14. The combination of the toothed wheel $H^{12}$. the shaft I. and the sleeve $H^9$. loosely fitted upon the shaft I. and having a clutch $H^{10}$. adapted to engage with the teeth of the wheel $H^{12}$. and being provided with the arm $H^{13}$. which is provided with the loosely pivoted trip $H^{15}$. substantially as specified.

15. The combination of the cam H. the rock shaft $H^3$. having the cam arm $H^2$. and the sleeve lever $H^6$. the retracting spring $H^{20}$. the sleeve $H^9$. having the clutch $H^{10}$. and the retracting spring $H^{22}$. and being provided with the arm $H^{13}$. to which the trip $H^{15}$. is loosely pivoted, substantially as specified.

16. In combination with the cam H. mounted upon the shaft $B^2$. a tripping device having a clutch connection with the clutch wheel $H^{12}$. and a rock bar mechanism that is adapted to transmit the movement of the cam H. to the clutch mechanism and thereby draw the clutch from the clutch wheel, substantially as described.

17. The combination, with electric circuits, of a circuit changing bar, a motor shaft for actuating the same, an escapement lever mounted on the shaft and provided with a long and a short arm, a detent lever engaging the arms of the escapement lever, a trip lever actuating the detent lever, and electro-magnetic devices in the circuits for actuating the trip lever, substantially as described.

18. The combination of a circuit changer, a circuit closer carrier, motor mechanisms for the same, a cam connected with one of said mechanisms, and a lever co-operating with said cam and arranged thereby to control the other motor mechanism, substantially as described.

19. The combination, with a plurality of circuits, an electro-magnet and its corresponding movable armature in each circuit, of a lock block for each armature, and independent means for moving the lock blocks, each lock block being arranged to lock its armature only if the latter be away from the magnet, when said block is so moved, substantially as described.

20. The combination of plurality of circuits, a make and break signal device in each circuit, an electro-magnet and its movable armature in each circuit, a circuit changer for the circuits, a circuit-closer carrying device having a circuit-closer for each circuit, operative connections from either armature to the circuit changer and to the circuit-closer carrier, the parts being so arranged that the circuit closing operation precedes the circuit changing operation, substantially as described.

21. In combination with a motor shaft of a circuit-changing mechanism, an escapement lever secured to said shaft, a reciprocating detent for the lever detaining it at the terminal points of its reciprocation, and permitting a half-revolution only of said shaft with each movement of said reciprocation, and electro-magnetic devices in the circuit or circuits operating said detent, substantially as described.

22. The combination, with the electro-magnet, its armature and the circuit-closer carrier, of a lock-block carried thereby arranged to lock the armature, the lock-block engaging the armature when the latter is away from the magnet, and escaping it when it is drawn up thereto, substantially as described.

23. The combination, with circuit-closing mechanism, and a trip rod for starting the same, of an electro-magnet in the circuit or circuits, its armature provided with terminal fingers, of which one engages the trip rod to start said mechanism, and the other is engaged by a locking device actuated by said mechanism, substantially as described.

24. In combination with electro-magnetic devices and a reciprocating detent actuated thereby, a motor shaft of a circuit changing mechanism, (controlling the circuit of said electro-magnetic devices) and an escapement lever moving with said shaft having a long and a short arm each provided with a terminal projection, the relation of the parts being such that each projection escapes the detent in one of the terminal positions of the latter and is held by it in the other, substantially as described.

25. In combination with circuits, circuit terminals, and a magnet, (with its movable armature) in each circuit, a circuit-closer-carrier having a movable circuit-closer for each circuit, each circuit-closer being adapted to be acted upon directly by the armature of the corresponding magnet to throw it into its operative position, and independent motor mechanism set in motion by the armature, actuating the circuit-closer carrier, substantially as described.

26. The combination, with circuits, and signal circuit wheels therein, of motor mechanism therefor, a detent for said mechanism, actuated to release the same by a break in one of the circuits, a second detent engaging said motor mechanism after it has passed through part of its period of movement, the second detent being actuated to release the mechanism by a train of clockwork set in motion at the aforesaid break, said clockwork being so regulated by its retarding means that the period from its start to the operation of the second detent is greater than that of any one of the signal circuit wheels, substantially as described.

27. The combination of a circuit closer carrier, motor mechanism therefor, a detent for the mechanism, a trip for the detent, independent motor mechanism and an operative connection therefrom to the trip to move the same into engagement with the detent, means for breaking said operative connection at the commencement of movement of said carrier, and automatic means for restoring said connection, substantially as described.

28. The combination, with the trip arm $H^{13}$, of the pivoted trip $H^{15}$ having a pin $H^{17}$ engaging with an extension of the arm, and a swinging detent $F^{36}$ with which the trip engages, substantially as described.

29. The combination of a detent, a trip for the same, clockwork mechanism for moving the trip into engagement with the detent and means for withdrawing the trip from engagement with said mechanism, said trip in said movement releasing said clock work, substantially as described.

30. The combination of a detent, a trip for the same, clockwork mechanism for moving the trip into engagement with the detent, and a lever carrying a stop for the pendulum of said clockwork, said trip actuating said lever to release and also to stop said pendulum, substantially as described.

31. The combination, with circuits, a circuit-closer carrier, a motor shaft therefor, and an arm carried by the shaft, of a shaft, detents vibrating loosely on said shaft, successively engaging said arm at different points of its revolution, and independent means for releasing or tripping said detents, substantially as described.

32. The combination, with circuits, a reciprocating circuit-closer carrier, and a motor shaft therefor, of detents arresting the motion of said shaft, one of said detents arresting it at the terminal position of said carrier, and the other midway between the terminal positions thereof, substantially as described.

33. The combination of a circuit, a circuit-closer carrier, means for reciprocating the same, a magnet (with its armature) in the circuit, a lock block actuated by the carrier to lock the armature, and a detent restraining the motion of the carrier before the completion of the first half of its period of reciprocation, said lock block engaging with said armature only after the release of said detent and in the remainder of the reciprocation of the carrier, substantially as described.

34. The combination of circuits, signal circuit wheels and magnets, with their movable armatures, therein, a circuit-closer carrier arranged to be operated by any one of said armatures upon the operation of its signal circuit wheel, and locking devices for locking the armatures when away from their magnets, actuated by said carrier but only after the completion of the signal of the signal circuit wheel, substantially as described.

35. The combination, with a series of circuits, signal circuit wheels, magnets and their armatures therein, and a circuit-closer carrier having a circuit closer for each circuit, of a series of locking devices, one for each armature, carrying indicating numerals, said numerals being so arranged as to be in an abnormal or indicating position when the locking device so numbered locks the armature, substantially as described.

36. The combination, with circuits, signal circuit wheels, magnets and their armatures therein, locking devices for the armatures, arranged, when actuated, to lock the same when away from their magnets, of a circuit-closer carrier, (and motor mechanism therefor) having in its period of movement two motions, the first commencing upon the operation of a signal circuit wheel, in which it closes a circuit, and the second started by the operation of a time train after the close of the signal, in which it opens the circuit and actuates the locking devices, substantially as described.

37. The combination, with circuits and a device for regulating the closure of the same, of a motor shaft for said device, an arm carried thereby, a detent for the arm, and a trip carrying a loosely pivoted trip finger for the detent, said finger being pressed against said detent to trip the same when moving in one direction, and passing loosely over the same in the other direction, substantially as described.

In testimony whereof I have signed my name to this specification in the presence of two subscribing witnesses.

THOMAS F. GAYNOR.

Witnesses:
MILT. V. BARLOW,
FRANK PARDON.